Figure 1:
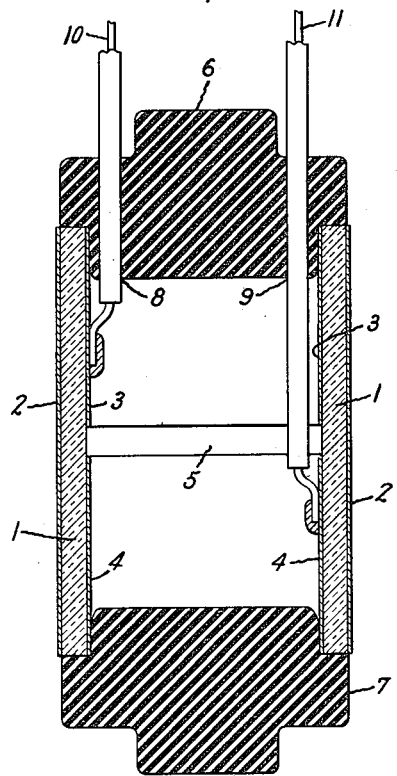

Nov. 18, 1952  W. H. JANSSEN  2,618,698
TRANSDUCER AND METHOD OF MAKING THE SAME
Filed May 21, 1951

Inventor:
William H. Janssen,
by Paul A. Frank
His Attorney.

Patented Nov. 18, 1952

2,618,698

UNITED STATES PATENT OFFICE 2,618,698

TRANSDUCER AND METHOD OF MAKING THE SAME

William H. Janssen, Schenectady, N. Y., assignor to General Electric Company, a corporation of New York Application May 21, 1951, Serial No. 227,497

3 Claims. (Cl. 177—386)

1

My invention relates to transducers and more particularly to compressional wave transducers employing piezoelectrically activated ferroelectric polycrystalline dielectric materials.

Compressional wave transducers are employed both in the transmitter and in the receiver of underwater object locating apparatus to provide the requisite transformation between electrical and compressional wave energy. In such apparatus it is often desirable to insonify and detect compressional waves in all directions within a substantially horizontal field of view. For this purpose a transmitter and receiver having a toroidal lobe pattern is to be preferred.

Heretofore, it has often been necessary to employ a complete circle or cylinder of discrete transducers connected in parallel or in parallel banks of serially interconnected transducers in order to obtain this toroidal lobe pattern and to provide proper voltage sensitivity or proper impedance matching with the remainder of the circuit. The use of a number of individual transducers, however, complicates the mechanical structure of the device, and if the transducer is constructed of a ferroelectric polycrystalline dielectric material such, for example, as barium titanate, a duplicate activation process is also required for each transducer.

An object of my invention, therefore, is to provide a simple and sturdy transducer composed of a single formed piece of ferroelectric dielectric material and having omni-directional characteristics and a relatively high voltage output for a given compressive force thereon.

A further object of my invention is to provide a new method of making and activating a ferroelectric polycrystalline transducer whereby the above-desired characteristics, usually attainable only by virtue of a number of transducers, may be obtained with a single transducer.

In the attainment of the foregoing objects, I provide a transducer employing a single tubular-shaped transducing element which behaves as a pair of similar transducing elements serially connected. The tubular transducing element has a thin conducting layer located on and preferably covering substantially its entire outer surface. This layer constitutes one electrode of the element. The inner surface of the tube is also provided with a conducting layer located thereon, and except for a circular ring about the center of the tube, this inner conducting layer preferably entirely covers the inner surface. As a result, there are two electrodes on the inner surface of the tube which are electrically separated by the insulating property of the tube. By applying a polarizing potential gradient between the inner and outer electrodes in a manner to be more fully described hereinafter, the portion of the transducing element located between the outer electrode and one of the inner electrodes is polarized in one radial direction while the portion located between the outer electrode and the other inner electrode is polarized in the opposite direction. As is shown hereinafter, the voltages developed across the two oppositely polarized portions of the transducing element due to a compressive force thereon appear in series between the two inner electrodes. The output voltage from a transducer employing such a transducing element is thus doubled.

Figure 3:
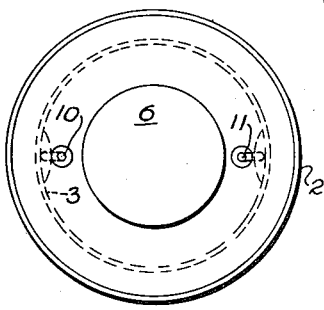

The novel features which I believe to be characteristic of my invention are set forth in the appended claims. The invention itself, together with further objects and advantages thereof may be better understood by reference to the following detailed description taken in connection with the accompanying drawing in which Fig. 1 is a sectional view of a transducer embodying my invention, Fig. 2 is a schematic diagram of a circuit which may be employed in activating the transducer of Fig. 1 in accord with the methods of my invention, and Fig. 3 is a plan view of the transducer of Fig. 1.

Referring to Fig. 1, a tubular-shaped transducing element on tube I constructed of a ferroelectric polycrystalline dielectric material, such as barium titanate, has located on its entire outer surface a conducting layer 2. Located on the inner surface of transducing element I are two electrodes 3 and 4. These electrodes comprise metallic layers preferably covering the entire inner surface of transducing element I except for a narrow ring 5 extending around the inner surface of element I at a point approximately midway between the ends thereof. At opposite ends of transducing element I are located end plugs 6 and 7 which are constructed of an insulating material and in a preferred embodiment of this invention are constructed of rubber such that a bottle stopper type of seal is provided between the plugs and the transducing element. End plug 6 is provided with cylindrical holes 8 and 9 to accommodate electrical connectors 10 and 11 which are connected respectively to electrodes 3 and 4.

Figure 2:
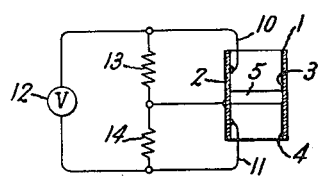

Referring to Fig. 2, transducing element I may be activated by means of an electric circuit as shown, such that the portions of the tube on opposite sides of ring 5 are oppositely polarized in a radial direction. In the circuit, a source of direct potential 12 has connected across its terminals a voltage divider comprising a resistor 13 and another resistor 14. Electrical conductors 10 and 11 of the transducer are connected to opposite terminals of source 12 and an electrical conductor is connected between the junction of resistor 13 and resistor 14 to metallic layer 2. It can thus be seen that the portions of element 1 separated by ring 5 are subjected to electrostatic fields in opposite radial directions.

As is well known to the art, activation of ferroelectric polycrystalline materials such as barium titanate, to exhibit remanent piezoelectric properties may be accomplished by temporarily subjecting the material to a polarizing unidirectional electric field either at room temperature or while the material is being cooled through its structural transition or "Curie" point. The electric field required for polarization at room temperature is somewhat greater than that required for polarization during cooling through the Curie temperature. With barium titanate, for example, activation at room temperature is preferably accomplished by applying a polarizing field of the order of 1000 volts per millimeter thickness for at least several minutes. Activation of the barium titanate ceramic may also be produced, for example, by heating the ceramic above its Curie point, approximately 120° centigrade, and applying a polarizing field in the neighborhood of 600 volts per millimeter thickness while the material cools to room temperature.

Consequently, with a sufficiently high potential 12 connected to transducer element 1 in the manner shown in Fig. 2, transducer element 1 may, in one operation, be properly activated to have oppositely polarized adjacent sections or portions. This is particularly advantageous since it establishes a definite line of demarkation between the oppositely polarized portions of element 1, whereas if the portions are charged separately, the charge tends to leak from one portion to the other during the charging process. It will be appreciated that the connection made to outer electrode 2 during this activation process is a temporary connection only and need not be included in the completed transducer of Fig. 1. The transducer of Fig. 1 may be employed to transmit compressional wave energy from the outer surface of tube 1 when energized by high frequency electrical waves supplied to connections 10 and 11, or may be employed to transform compressional wave energy incident upon the outer surface of tube 1 into electrical energy developed at connections 10 and 11.

Because the voltages developed between metallic layer or electrode 2 and electrodes 3 and 4 are inherently serially connected in an additive manner for a compressive force on transducing element 1, this device has the advantages over prior art transducers of simple and economical construction, high signal voltage for a given compressive force, and omni-directional characteristics. Also, because of its sturdy nature and ease of activation, it is applicable to various types of locators employing transducers of this type.

While this invention has been described by a particular embodiment thereof, it will be understood that those skilled in the art may make many changes and modifications which fall within this invention. Therefore, by the appended claims it is intended to cover all such changes and modifications which fall within the true spirit and scope of this invention.

What I claim as new and desire to secure by Letters Patent of the United States is:

1. A transducer comprising barium titanate formed in the shape of a tube, an outer electrode comprising a thin metallic conducting layer deposited on and covering the outer surface of said tube, first and second annular inner electrodes comprising metallic conducting layers deposited on and covering the inner surface of different portions of said tube, said portions extending from opposite ends of said tube and being separated along a ring located about the inner surface of said tube, first and second resilient insulating plugs positioned in opposite ends of said tube to effect a seal at the ends thereof, and a pair of electrical conductors extending through at least one of said plugs and connected to different ones of said inner electrodes, said tube portions having piezoelectric polarization in opposite radial directions to enable an energy transformation between a voltage subsisting between said conductors and a compressional force at the outer surface of said tube.

2. The method of making a transducer of the type including a ferroelectric polycrystalline dielectric material as the piezoelectric element thereof, which method comprises placing a first conducting layer on one surface of the dielectric material, placing second and third conducting layers on the opposite surface of the material and on different closely spaced portions thereof that together are substantially coextensive with the first layer, and polarizing the two portions in opposite directions by supplying substantially constant voltages of different magnitude to the three layers, the voltage supplied to the second layer being greater than that supplied to the first layer and the voltage supplied to the first layer being greater than that supplied to the third layer.

3. The method of making a transducer, which method comprises covering the outer surface of a hollow tube of barium titanate ceramic with a metallic conducting layer, covering the inner surface of the tube except for a narrow ring about the center thereof with two other spaced metallic conducting layers, and piezoelectrically activating the two ring-divided tube portions of the tube in opposite radial directions by supplying substantially constant voltages of different magnitude to the three conducting layers, the voltage supplied to one inner conducting layer being a polarizing magnitude greater than that supplied to the outer layer and the voltage supplied to the outer layer being a polarizing magnitude greater than that supplied to the other inner layer.

WILLIAM H. JANSSEN.

REFERENCES CITED

The following references are of record in the file of this patent:

UNITED STATES PATENTS

| Number | Name | Date |
| --- | --- | --- |
| 2,419,197 | Benioff | Apr. 22, 1947 |
| 2,420,864 | Chilowsky | May 20, 1947 |
| 2,486,560 | Gray | Nov. 1, 1949 |